(12) United States Patent
Miyoshi et al.

(10) Patent No.: US 10,012,087 B2
(45) Date of Patent: Jul. 3, 2018

(54) GAS TURBINE INCLUDING A CONTOURED END WALL SECTION OF A ROTOR BLADE

(75) Inventors: Ichiro Miyoshi, Yokohama (JP); Shinichi Higuchi, Yokohama (JP); Masami Noda, Yokohama (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 436 days.

(21) Appl. No.: 14/413,826

(22) PCT Filed: Sep. 12, 2012

(86) PCT No.: PCT/JP2012/073248
§ 371 (c)(1),
(2), (4) Date: Jan. 9, 2015

(87) PCT Pub. No.: WO2014/041619
PCT Pub. Date: Mar. 20, 2014

(65) Prior Publication Data
US 2015/0204196 A1    Jul. 23, 2015

(51) Int. Cl.
*F01D 5/14* (2006.01)
*F02C 3/04* (2006.01)
(Continued)

(52) U.S. Cl.
CPC ............. *F01D 5/143* (2013.01); *F01D 5/145* (2013.01); *F02C 3/04* (2013.01); *F01D 5/082* (2013.01);
(Continued)

(58) Field of Classification Search
CPC .......... F01D 5/141; F01D 5/142; F01D 5/143; F01D 5/145; F01D 5/081; F01D 5/085;
(Continued)

(56) References Cited

U.S. PATENT DOCUMENTS 3,989,410 A * 11/1976 Ferrari ............... F01D 3/00
415/115
4,420,288 A    12/1983 Bischoff
(Continued)

FOREIGN PATENT DOCUMENTS

CN    101775999 A    7/2010
DE    32 02 855 C1    3/1983
(Continued)

OTHER PUBLICATIONS

International Search Report (PCT/ISA/210) dated Nov. 27, 2012, with English translation (Four (4) pages).
(Continued)

*Primary Examiner* — William H Rodriguez
*Assistant Examiner* — Thomas Burke
(74) *Attorney, Agent, or Firm* — Crowell & Moring LLP (57) ABSTRACT

The object of the invention is to suppress development of a secondary current whirl in the vicinity of a rotor blade front edge of a gas turbine even when a cooling refrigerant is mixed in from the front edge of an end wall section of the rotor blade. In a gas turbine rotor blade 4 including a wing shape section 12 formed of a negative pressure surface 12*d* extending from a front edge 12*a* to a rear edge 12*b*, a pressure surface 12*c* opposing the negative pressure surface 12*d* and extending from the front edge 12*a* to the rear edge 12*b*, and a tip surface 13 surrounded by the top end of the negative pressure surface 12*d* and the top end of the pressure surface 12*c*, and an end wall section 10 connected to the bottom end of the negative pressure surface 12*d* and the bottom end of the pressure surface 12*c*, the rotor blade has a convex shape in positions constituting the negative pressure surface 12*d* side and the front edge 12*a* side of the end wall section 10, and the rotor blade has a concave shape in
(Continued)

positions constituting the pressure surface 12c side and the front edge 12a side of the end wall section 10.

12 Claims, 10 Drawing Sheets

(51) Int. Cl.
    *F01D 5/08*     (2006.01)
    *F01D 5/18*     (2006.01)
    *F01D 5/20*     (2006.01)

(52) U.S. Cl.
    CPC ............... *F01D 5/187* (2013.01); *F01D 5/20* (2013.01); *F05D 2240/301* (2013.01); *F05D 2240/55* (2013.01)

(58) Field of Classification Search
    CPC ............... F01D 5/087; F05D 2240/301; F05D 2240/305; F05D 2240/306; F05D 2240/80
    See application file for complete search history.

(56) References Cited

U.S. PATENT DOCUMENTS

| | | | |
|---|---|---|---|
| 4,465,433 A | 8/1984 | Bischoff | |
| 6,017,186 A | 1/2000 | Hoeger et al. | |
| 6,017,816 A | 1/2000 | Ni et al. | |
| 6,077,035 A * | 6/2000 | Walters | F01D 5/081 415/115 |
| 6,283,713 B1 * | 9/2001 | Harvey | F01D 5/143 415/191 |
| 8,192,153 B2 | 6/2012 | Harvey et al. | |
| 8,727,716 B2 * | 5/2014 | Clements | F01D 9/04 415/191 |
| 2003/0143079 A1 * | 7/2003 | Kawarada | F01D 5/141 416/243 |
| 2008/0145216 A1 * | 6/2008 | Klasing | F01D 5/143 415/208.2 |
| 2008/0267772 A1 * | 10/2008 | Harvey | F01D 5/141 415/191 |
| 2009/0053066 A1 | 2/2009 | Iida | |
| 2009/0274558 A1 * | 11/2009 | Ravanis | F01D 5/141 416/223 A |
| 2010/0158696 A1 * | 6/2010 | Pandey | F01D 5/143 416/243 |
| 2010/0166558 A1 | 7/2010 | Siden et al. | |
| 2010/0196154 A1 | 8/2010 | Sakamoto et al. | |
| 2011/0044818 A1 * | 2/2011 | Kuhne | F01D 5/143 416/212 A |
| 2011/0189023 A1 * | 8/2011 | Guimbard | F01D 5/143 416/223 R |
| 2012/0051930 A1 | 3/2012 | Pandey et al. | |
| 2012/0201688 A1 * | 8/2012 | Mahle | F01D 5/143 416/235 |
| 2013/0004331 A1 * | 1/2013 | Beeck | F01D 5/143 416/97 R |

FOREIGN PATENT DOCUMENTS

| | | |
|---|---|---|
| EP | 0 846 867 A2 | 6/1998 |
| EP | 1 270 872 A1 | 1/2003 |
| FR | 2 928 174 A1 | 9/2009 |
| JP | S62-43042 B2 | 9/1987 |
| JP | 2002-349201 A | 12/2002 |
| JP | 2007-247542 A | 9/2007 |
| JP | 2011-513628 A | 4/2011 |
| JP | 2012-52526 A | 3/2012 |
| JP | 2012-514156 A | 6/2012 |
| WO | WO 2009/093356 A1 | 7/2009 |

OTHER PUBLICATIONS

Chinese-language Office Action issued in counterpart Chinese Application No. 201280074579.5 dated Apr. 18, 2016 (5 pages).
Eurapean Search Report issued in counterpart European Application No. 128844617.7 dated Jul. 29, 2016 (six pages).

* cited by examiner

GAS TURBINE INCLUDING A CONTOURED END WALL SECTION OF A ROTOR BLADE

TECHNICAL FIELD

The present invention relates to a gas turbine.

BACKGROUND ART

With respect to a turbine blade of a gas turbine, the load per one blade tends to increase by considering cost reduction and the like by reduction of the number of pieces of the blade. In a blade to which a large load is applied, a flow in a cross section perpendicular to a flow of a mainstream gas: i.e. a secondary flow increases in the vicinity of an end wall. Because the secondary flow increases, the flow rate in the vicinity of the end wall reduces, and, by the portion, the flow rate in the vicinity of the average of the radial position on the outer periphery side and the inner periphery side: i.e. the average diameter of the blade increases, and the blade load increases. It is known that the increase of the total pressure loss is caused as a result of it.

A method has been disclosed in which the shape of the end wall surface is made a non-axisymmetrical shape in order to cope with the increase of the total pressure loss in a blade having a large blade load. As an example, a blade has been disclosed in PTL-1 in which a curved surface having a pair of a convex surface on the pressure surface side and a concave surface on the negative pressure surface side is formed in the end wall surface.

A blade has been disclosed in PTL-2 in which a convex region is arranged in the end wall so as to be uniform in the rotation direction: i.e. rotationally symmetric.

CITATION LIST

Patent Literature

PTL 1: U.S. Pat. No. 6,283,713
PTL 2: Japanese Patent Application Laid-Open No. 2002-349201

SUMMARY OF INVENTION

Technical Problem

Although the blade disclosed in PTL-1 copes with a secondary flow caused by imbalance of the centrifugal force applied to the fluid and the pressure gradient, it cannot cope with a secondary flow caused by mixing in of a cooling refrigerant from the front edge of the end wall section of the rotor blade.

Although the blade disclosed in PTL-2 envisages to narrow a flow passage in order to increase the flow velocity of a mainstream gas slowdown section, the throat becomes small and there is a risk of generating a shock wave.

The object of the present invention is to suppress development of a secondary flow whirl in the vicinity of the front edge of a rotor blade of a gas turbine even when a cooling refrigerant may be mixed in from the front edge of the end wall section of the rotor blade.

Solution to Problem

In a gas turbine rotor blade including a wing shape section formed of a negative pressure surface extending from a front edge to a rear edge, a pressure surface opposing the negative pressure surface and extending from the front edge to the rear edge, and a tip surface surrounded by the top end of the negative pressure surface and the top end of the pressure surface, and an end wall section connected to the bottom end of the negative pressure surface and the bottom end of the pressure surface, the rotor blade has a convex shape in positions constituting the negative pressure surface side and the front edge side of the end wall section, and the rotor blade has a concave shape in positions constituting the pressure surface side and the front edge side of the end wall section.

Advantageous Effects of Invention

According to the present invention, even when a cooling refrigerant may be mixed in from the front edge of the end wall section of the rotor blade, development of a secondary flow whirl in the vicinity of the front edge of the rotor blade of a gas turbine can be suppressed.

BRIEF DESCRIPTION OF DRAWINGS

FIG. 2b is an enlarged view of a turbine including the rotor blade 4 shown in FIG. 2a.

DESCRIPTION OF EMBODIMENTS

Figure 1:
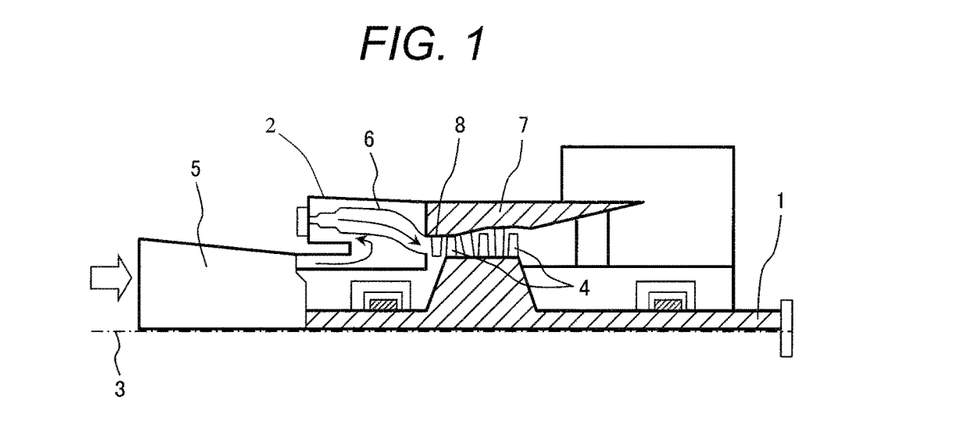
FIG. 1 is a cross-sectional view of a gas turbine.

FIG. 1 shows a cross-sectional view of a gas turbine. The gas turbine shown in FIG. 1 includes a rotor 1 rotating around a rotation axis 3 and a stator 2 that is a stationary body. A plurality of rotor blades 4 are arranged in the rotor 1. A plurality of stationary blades 8 are arranged in a casing 7 so as to correspond to these rotor blades 4.

The gas turbine further includes a compressor 5 that compresses air, a combustor 6 that combusts compressed air compressed by the compressor 5 and fuel and forms a combustion gas, and a turbine driven by the combustion gas formed by the combustor 6. The turbine includes a plurality of the rotor blades 4 that receive the combustion gas and rotate and a plurality of the stationary blades 8 that restore the static pressure of the combustion gas having rotated the rotor blades 4. A high temperature gas formed by the combustor 6 is blown to the rotor blades 4 through the stationary blades 8 and rotates the rotor 1. It is necessary to cool the rotor blades 4 and the stationary blades 8 exposed to the high temperature gas according to the necessity. As a cooling refrigerant, a part of the compressed air compressed by the compressor 5 is possibly utilized sometimes.

Figure 2A:
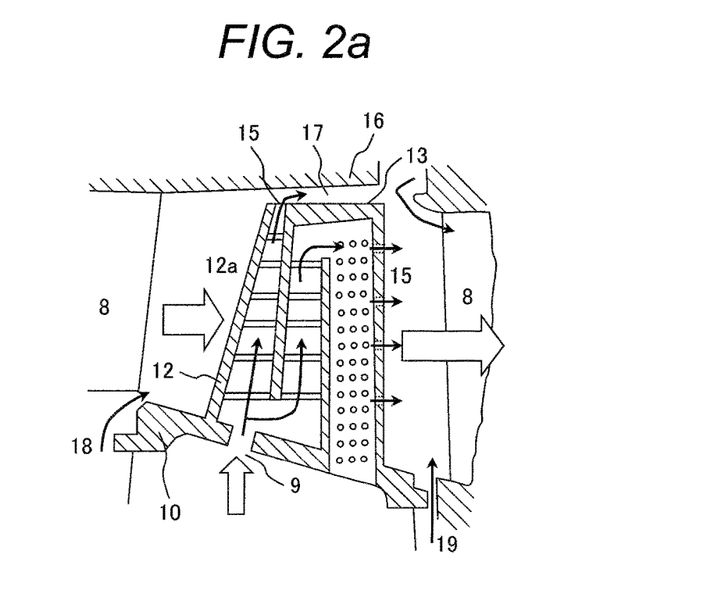
FIG. 2a is an enlarged view of a rotor blade 4.
Figure 2B:
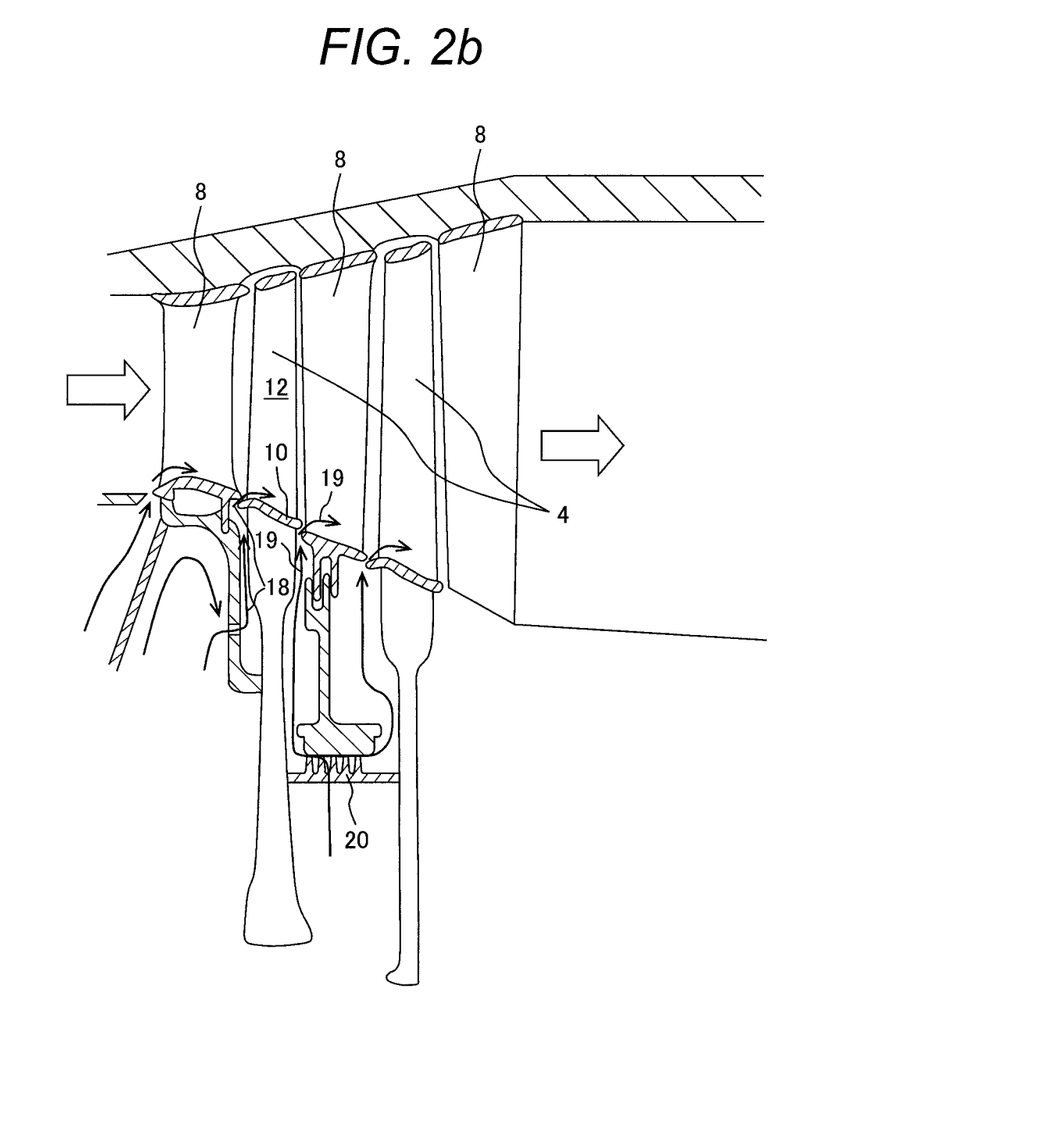

FIG. 2a shows an enlarged view of the rotor blade 4. Also, FIG. 2b shows an enlarged view of the turbine including the rotor blade 4 shown in FIG. 2a. The rotor blade 4 is attached to the turbine rotor 1. The rotor blade 4 includes an inner periphery side end wall section 10 positioned on the inner periphery side: i.e. the turbine rotor 1 side with respect to the rotation axis 3, and a wing shape section 12 that extends outward in the radial direction from an outer peripheral surface 10a of the end wall section. Between a tip surface 13 that is a closed surface of the outermost side in the radial direction of the blade shape section 12 and an end wall section 16 of the stationary blade 8 positioned outside the tip surface 13, a gap 17 where fluid flows is formed. Also, in some wing shape section 12, a hollow section for allowing the cooling refrigerant to flow and cooling the blade from the inside is formed. As shown in FIG. 2, the cooling refrigerant flows in from an inlet 9, and cools the wing shape section in a process of flowing in the arrow direction.

In a case of a gas turbine of an open cooling method of using compressed air from the compressor 5 as a cooling air supply source to the rotor blade 4 and emitting air after cooling having cooled the high temperature portion to the mainstream, cooling air is introduced using a cooling air introduction port arranged in the rotor 1. In the case of a gas turbine of such an open cooling method, a seal mechanism 20 restricting the flow rate of the cooling refrigerant that passes through the gap between the rotating body and the stationary body is provided.

The cooling air having been introduced through the inlet 9 for cooling the rotor blade 4 passes through discharge ports 15 arranged in the rotor blade 4 and is discharged to a gas passage. A part of the air not used for cooling the rotor blade 4 is mixed in to a mainstream gas flow passage through the gap between the stationary blade 8 and the rotor blade 4 after cooling the rotor 1. As shown by the arrows in FIG. 2b, there are mixing in 18 from the upstream side of the rotor blade 4 and mixing in 19 from the downstream side. Because the rotor blade 4 is a rotating body, particularly, mixing in 18 from the upstream side of the rotor blade 4 strengthens a whirl generated from the inner periphery side front edge of the wing shape section 12. By the effect of the whirl, energy between the blades dissipates. In each embodiment described below as the embodiment of the present invention, the cases will be described in which a gas turbine of an open cooling method of emitting the air after cooling having cooled the high temperature portion to the mainstream is made a premise and the effect by mixing in 18 from the upstream side of the rotor blade 4 can be reduced.

Figure 3:
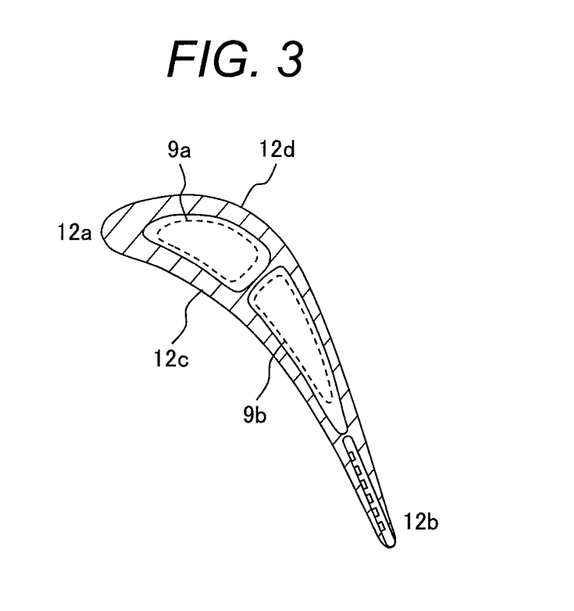
FIG. 3 is a drawing showing a cross-sectional shape of a wing shape section 12.

FIG. 3 shows a cross-sectional shape of the wing shape section 12. The wing shape section 12 includes a pressure surface 12c forming a concave shape in the blade arc direction, a negative pressure surface 12d forming a convex shape in the blade arc direction, a blade front edge 12a, and a blade rear edge 12b. More specifically, the wing shape section 12 is formed of the negative pressure surface 12d extending from the front edge 12a to the rear edge 12b, the pressure surface 12c opposing the negative pressure surface 12d and extending from the front edge 12a to the rear edge 12b, and the tip surface 13 surrounded by the top end of the negative pressure surface 12d and the top end of the pressure surface 12c. Also, the end wall section 10 is connected to the bottom end of the negative pressure surface 12d and the bottom end of the pressure surface 12c.

The wing shape section 12 is formed so that the blade thickness gradually increases from the front edge side toward the center side and gradually reduces thereafter toward the rear edge side. There is also a case the wing shape section 12 has hollow sections 9a, 9b therein and is configured to make a cooling refrigerant flow through the hollow sections and cool the blade from the inside. Also, in FIG. 2, line arrows show the flow of the cooling air, and framed arrows show the flow of the high temperature gas: i.e. the mainstream working gas. Further, the negative pressure surface 12d is the blade back side section, and the pressure surface 12c is the blade belly side section. It is also possible to arrange fins in the hollow sections 9a, 9b to improve heat conversion. When heat conversion is improved, the amount of the cooling refrigerant itself can be reduced, and an influence of leakage of the cooling refrigerant can be also reduced.

Figure 4A:
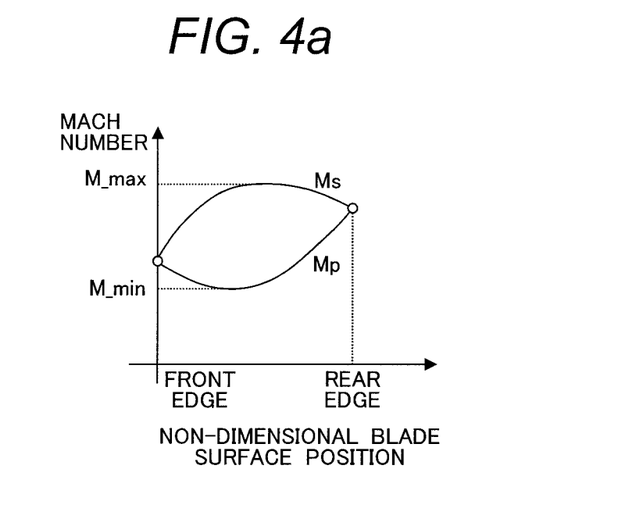
FIG. 4a is a drawing showing the blade surface Mach number in the blade cross section in the vicinity of an inner periphery side end wall of the rotor blade 4.

FIG. 4a is a drawing showing the blade surface Mach number in the blade cross section in the vicinity of the end wall of the rotor blade 4. The horizontal axis shows the blade surface position from the blade front edge 12a to the blade rear edge 12b, and the vertical axis shows the Mach number. The blade surface Mach number of the negative pressure surface 12d in the vicinity of the end wall section 10 is shown by Ms, and the blade surface Mach number of the pressure surface 12c in the vicinity of the end wall section 10 is shown by Mp.

As shown in FIG. 4a, the blade surface Mach number of the negative pressure surface 12d shows the maximum blade surface Mach number M_max in the intermediate section of the blade front edge 12a and the blade rear edge 12b, and greatly reduces from the intermediate section to the blade rear edge 12b. The reason is that, when the mainstream fluid flows from the inlet to the outlet of the blade cascade formed by a plurality of the rotor blades 4, gas expansion of the mainstream fluid is performed. M_min shows the minimum blade surface Mach number in the pressure surface 12c. As the difference of M_max and M_min is larger, the difference of the maximum pressure and the minimum pressure applied to the wing shape section comes to be large, and the load applied to the blade increases.

In a blade where the load applied to the blade is large, whether it's the inner periphery side end wall section or the outer periphery side end wall section in other words the turbine casing side end wall section, the secondary flow increases in the vicinity of the end wall. The secondary flow is a flow in a cross section perpendicular to the flow of the mainstream gas. The secondary flow generated in the vicinity of the end wall is generated because the fluid is drawn to the negative pressure surface side where the pressure is small. The reason is that, in the vicinity of the end wall, the flow velocity drops by the effect of the viscosity of the fluid, the centrifugal force applied to the fluid reduces, and the effect by the pressure gradient becomes excessive.

Due to the increase of the secondary flow, the flow rate in the vicinity of the end wall reduces, the flow rate in the vicinity of the average diameter that is the flow passage center increases by the portion, and the blade load increases. The increase of the blade load means the increase of the Mach number. When the Mach number increases, the friction loss at the wall surface increases, and, in the supersonic range, the shock wave loss by a shock wave increases which results in the increase of the total loss.

Figure 4B:
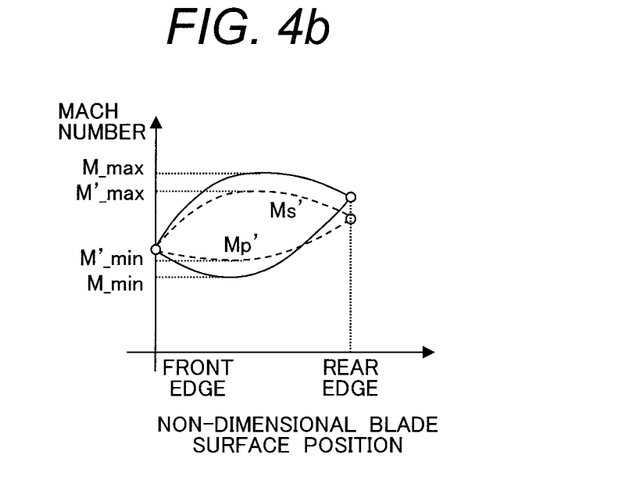
FIG. 4b is a drawing in which the blade surface Mach number distribution of a case the blade load reduces is added to FIG. 4 in a dotted line.

For comparison purposes, a drawing is shown in FIG. 4b in which the blade surface Mach number distribution of a case the blade load reduced is added to FIG. 4a in a dotted line. Similarly to FIG. 4a, the blade surface Mach number of the negative pressure surface 12d is shown by Ms', and the blade surface Mach number of the pressure surface 12c is shown by Mp'. Also, in a similar manner, the maximum blade surface Mach number of a case the blade load reduced is shown as M'_max, and the minimum blade surface Mach number is shown as M'_min. In comparison to the rotor blade in which the blade load is large shown in FIG. 4a, it is known that the difference of M'_max and M'_min is smaller in the rotor blade in which the blade load is small which is added to FIG. 4b.

With respect to the event that the total pressure loss increases in a blade in which the load applied to the blade is large as described above, several methods have been proposed which make the shape of the end wall surface of the turbine blade non-axisymmetric. According to these methods, the total pressure loss in the blade cascade can be reduced. For example, as disclosed in PTL-1, there is a method of making the end wall a curved surface having a pair of a convex surface on the pressure surface side and a concave surface on the negative pressure surface side.

Figure 5:
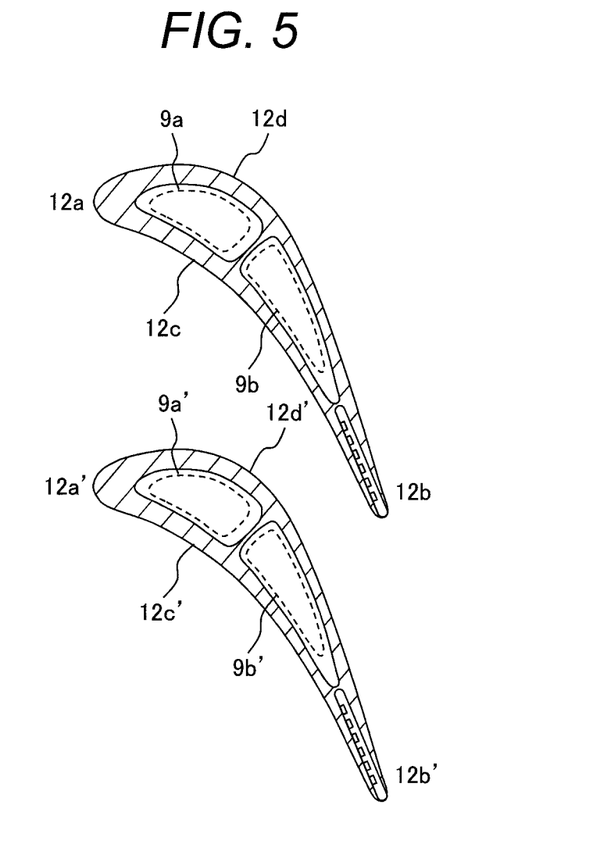
FIG. 5 is a drawing showing a turbine rotor blade cascade in which the rotor blades 4 are arranged in the turbine.

In FIG. 5, a turbine rotor blade cascade is shown in which the rotor blades 4 are arranged in the turbine. FIG. 5 shows hollow sections 9a, 9a', 9b, 9b', front edges 12a, 12a', rear edges 12b, 12b', pressure surfaces 12c, 12c', and negative pressure surfaces 12d, 12d'. When the secondary flow in a region embraced by the negative pressure surface 12d and the pressure surface 12c is to be suppressed between the rotor blades 4 arrayed in the peripheral direction, as a guideline for changing the end wall shape, it can be conceived to define the shape watching the pressure gradient. This guideline is based on a thought that fluid is drawn to the negative pressure surface side by imbalance of the centrifugal force applied to the fluid and the pressure gradient, and the secondary flow develops. When the end wall shape is defined based on this guideline, it is determined so that the end wall shape on the pressure surface 12c side becomes a convex shape and the end wall shape on the negative pressure surface 12d side becomes a concave shape. According to this method, there is an effect of suppressing the secondary flow in the region embraced by the pressure surface 12c and the negative pressure surface 12d.

However, the present inventors have come to know that the increase of a horse shoe shape whirl generated from the front edge 12a cannot be suppressed only by this thought. In other words, it can be said that, according to the method described above, because the guideline of definition of the end wall shape in the vicinity of the blade front edge 12a cannot be achieved, the effect of suppressing the secondary flow by the blade shape in which the effect of the horse shoe shape whirl is large reduces.

Figure 6:
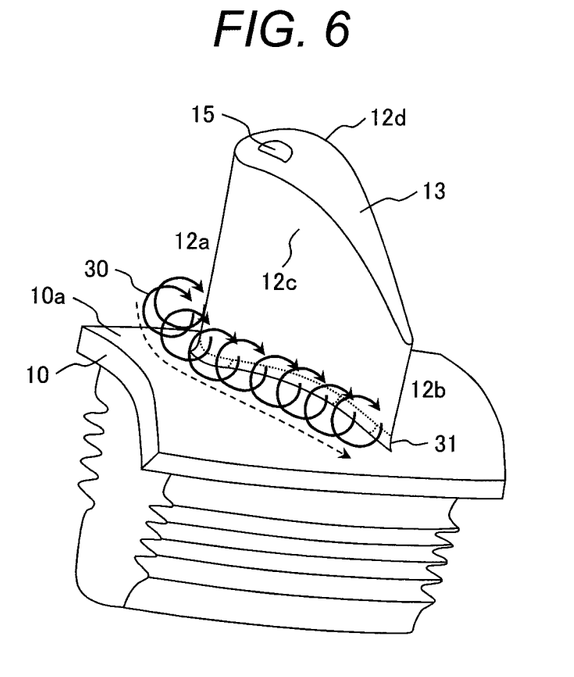
FIG. 6 is a drawing showing a whirl generated from a front edge 12a of the rotor blade 4.

In FIG. 6, a whirl generated from the blade front edge 12a of the rotor blade 4 is shown. A whirl 30 generated in the vicinity of the blade front edge 12a of the rotor blade 4 and the vicinity of the outer peripheral surface 10a of the end wall section is called a horse shoe shape whirl. The horse shoe shape whirl 30 develops toward the blade rear edge 12b. This horse shoe shape whirl 30 is a whirl generated in the vicinity of the blade front edge 12a. In the turbine having such a blade cascade as described above that the cooling air is mixed in as mixing in 18 from the upstream side of the rotor blade 4 and the whirl generated from the inner periphery side front edge of the wing shape section 12 is strengthened, the effect of this horse shoe shape whirl becomes large.

In such a blade cascade, when the cooling air and the like may be mixed in from the upstream side of the outer peripheral surface 10a of the end wall section which is the hub side, the pressure difference of the inlet and the outlet in the end wall section 10 reduces, and the slowdown of the mainstream fluid becomes larger. As a result, the total pressure loss in the blade cross section of the end wall section 10 further increases.

Below, embodiments of the turbine rotor blade will be described which can also suppress the secondary flow in a region embraced by the negative pressure surface 12d and the pressure surface 12c while suppressing the increase of the horse shoe shape whirl 30 generated in the blade front edge 12a. Also, in each embodiment, with respect to the convex shape, concave shape and the like, there are descriptions on the positions on the end wall section 10 of each rotor blade 4. They mean such a position on the end wall section 10 of each rotor blade 4 to which the rotor blade 4 is positioned when each rotor blade 4 is assembled into a segment shape.

Embodiment 1

Figure 7:
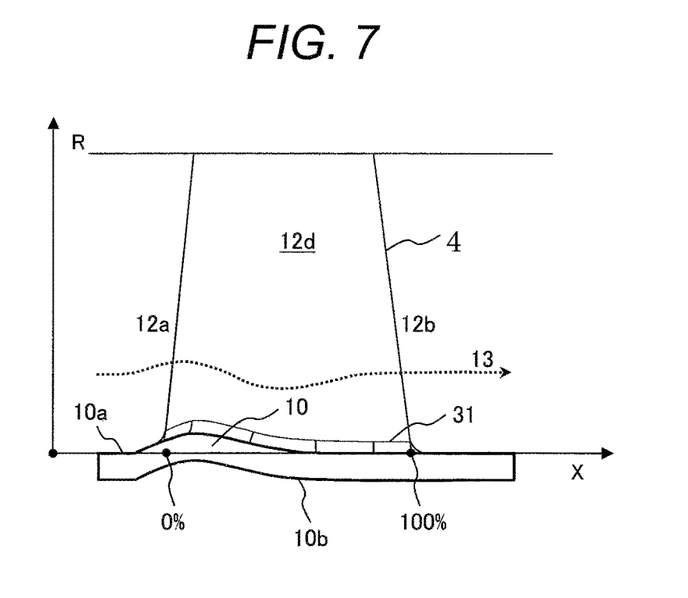
FIG. 7 is the turbine rotor blade 4 of Embodiment 1, and is a diagonal view of a negative pressure surface 12d of the wing shape section 12.
Figure 8:
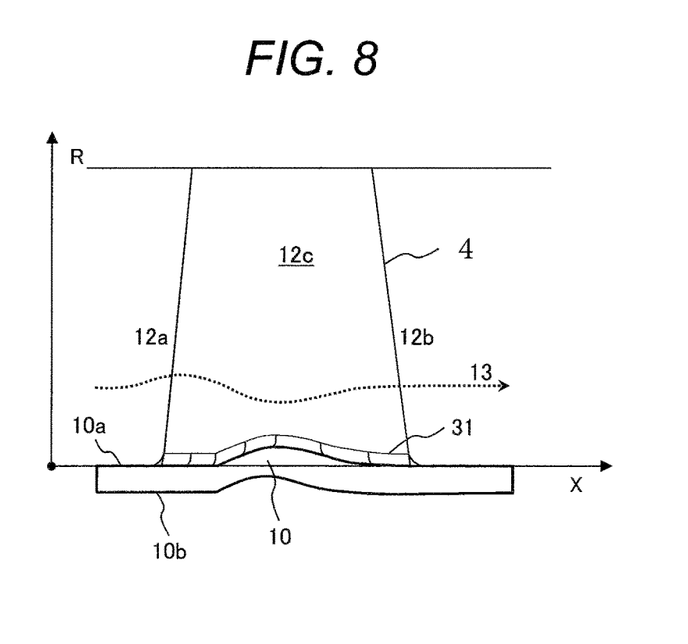
FIG. 8 is the turbine rotor blade 4 of Embodiment 1, and is a diagonal view of a pressure surface 12c of the wing shape section 12.

FIG. 7 is the turbine rotor blade 4 of Embodiment 1 of the present invention, and is a diagonal view of the negative pressure surface 12d of the wing shape section 12. FIG. 8 shows the turbine rotor blade 4 of Embodiment 1 of the present invention, and is a diagonal view of the pressure surface 12c of the wing shape section 12. The flow 13 of the mainstream gas is shown by an arrow. The front edge 12a side is the upstream side with respect to the flow of the mainstream gas, and the rear edge 12b is on the downstream side. The horizontal axis shows the position in the direction parallel to the rotation axis 3, the position of the contact point of the front edge 12a and the outer peripheral surface 10a of the end wall section is made 0%, and the position of the contact point of the rear edge 12b and the outer peripheral surface 10a of the end wall section is made 100%. R of the vertical axis is a coordinate axis expressing the radial position. The end wall section 10 is positioned on the inner periphery side in the radial direction of the wing shape section 12. Hereinafter, in each embodiment, the outer periphery side means a side far from the rotor 1 with respect to the wing shape section 12 when the rotor blade 4 is incorporated into the gas turbine, and the inner periphery side means the rotor 1 side. Also, "out" means the outer periphery side, and "in" means the inner periphery side. The radial direction is to express the radial direction of a circle that is the cross section of the rotor 1.

In the rotor blade 4 of the present embodiment, as shown in FIG. 7, the end wall outer peripheral surface 10a which is a surface on the outer periphery side of the inner periphery side end wall section 10 has an outward convex shape on the negative pressure surface 12d side of the wing shape section 12. This convex shape is positioned on the blade front edge 12a side, and preferably in the vicinity of the blade front edge 12a. It is more preferable that, when the front edge 12a of the wing shape section in contact with the end wall section outer surface 10 is made 0% and the rear edge 12b is made 100% using the coordinate in the turbine rotation axis direction as the reference, the end wall section outer peripheral surface 10a is formed so that the vertex of the outward convex shape is positioned within the range of 40% or less. The reason is that the fact that mixing in of the cooling air becomes a cause of generation of the whirl has been watched and has been coped with.

The cooling air is mixed in a region in the vicinity of the front edge 12a of the rotor blade 4, collides with the blade front edge 12a, sharply slows down and is simultaneously rolled up on the blade surface, and the whirl is generated. The mainstream gas also forms a whirl so as to be drawn into this whirl. With respect to this whirl, by making the vicinity of the front edge 12a of the outer peripheral surface 10a of the end wall section an outward convex shape, the flow velocity is increased, and the slowdown of the fluid is suppressed. This effect is achieved by that the flow velocity can be sharply increased by making the outer peripheral surface 10a of the end wall section an outward convex shape and narrowing the flow passage, and generation of the whirl by the cooling air can be suppressed. When the vertex is positioned too much on the downstream side, it is worried about that the convex shape in the vicinity of the front edge 12a becomes a same degree to "R" (roundness), however, when the vertex of the inward convex shape is positioned in a range smaller than 40%, the effect of suppressing the problem caused by generation of the whirl in the vicinity of the front edge 12a is surely secured.

In PTL-1, contrary to the present embodiment, a technology has been disclosed in which the shape of the outer peripheral surface of the end wall section on the front edge side of the pressure surface side is made an outward convex shape. This is based on a thought that generation of a whirl is caused by imbalance of the pressure gradient in the vicinity of the end wall and the centrifugal force applied to the fluid. Even between the rotor blades 4, there is a pressure gradient from the pressure surface side toward the negative pressure side, and the fluid element in the vicinity of the end wall is drawn from the pressure surface side to the negative pressure side. However, the rotor blade is featured to be a blade rotating around the axis. In a case fluid is mixed in from the upstream side as premised in the present embodiment, the fluid collides with the negative pressure surface in the vicinity of the rotor blade front edge, and induces a strong secondary flow. The force inducing the secondary flow here is much larger than the pressure gradient. Therefore, in such a situation that the cooling refrigerant is mixed in as the present embodiment, by the technology of PTL-1, the effect of improving the turbine blade performance is small.

In the rotor blade 4 of the present embodiment, as shown in FIG. 8, the end wall outer peripheral surface 10a which is the surface on the outer periphery side of the end wall section 10 has an outward convex shape on the pressure surface 12c side of the wing shape section 12. This convex shape is positioned in the vicinity of the middle of the front edge 12a and the rear edge 12b. On the other hand, the position in the radial direction in the vicinity of the front edge 12a on the pressure surface 12c side is on the inner periphery side of the vertex of the convex shape on the negative pressure surface 12d side. Further, the position in the radial direction in the vicinity of the rear edge 12b on the pressure surface 12c side can be determined appropriately so that the performance is improved.

It is preferable that the vertex of the convex shape on the pressure surface 12c side is positioned within the range of 30% or more and 80% or less. This region is a region where the flow velocity sharply drops and the whirl is liable to be generated because the pressure gradient from the pressure surface 12c toward the negative pressure surface 12d between the rotor blades 4 is largest. The magnitude of this pressure gradient is as shown in FIG. 4 as the difference of Ms and Mp. The event the pressure gradient is large is equivalent to that the blade load is large, the secondary flow is strong, and the slowdown of the mainstream gas is large. By employing the outward convex shape as the present embodiment, the flow velocity can be increased and the sharp slowdown of the flow velocity can be suppressed. When the vertex of the convex shape is in a position of less than 30%, the outward convex region in the position where the pressure gradient is large is narrowed, therefore the flow velocity adjustment amount reduces, and the secondary flow suppressing effect is small. Also, when the vertex of the convex shape is in a position of larger than 80%, there is a risk that the flow velocity sharply increases on the downstream side of the outward convex region and the blade cascade performance deteriorates due to the shockwave loss.

Here, the structure of a position where the wing shape section 12 and the end wall section in contact with each other will be described. In this position, a region 31 having roundness called "R" exists. In other words, the end wall section and the wing shape section 12 do not cross with each other strictly perpendicularly. However, the magnitude of this "R" 31 is a value neglected in designing. In the present embodiment, although the point of 0%-100% is determined using the contact point of the outer periphery side end wall section inner surface 10 and the wing shape section 12 as the reference, this means the contact point in terms of design, and "R" has not been considered.

Next, the numerical values cited specifically with respect to the vicinity of the front edge and the vicinity of the middle of the front edge and the rear edge will be explained. First, with respect to the vicinity of the front edge, when the vertex of the convex shape comes to the upstream of 40%, the maximum convex amount of the convex region continuing to the upstream side becomes the same degree with "R" arranged in the wing shape section 12 and the end wall section 10, and the effect of the convex region becomes a negligible degree. Because of such a reason, the vertex of the convex shape in the vicinity of the front edge is made to be in a position of 40% or less. Next, with respect to the vicinity of the middle, when the vertex of the convex shape comes to the upstream side of the position of 30%, the maximum convex amount of the convex shape on the downstream side becomes the same degree with "R", and when the vertex of the convex shape comes to be in a position of larger than 80%, the maximum convex amount of the convex shape becomes the same degree with "R". Therefore, with respect to the vicinity of the middle, the vertex of the convex shape is made preferable to be in a position of 30% or more and 80% or less.

As described above, the rotor blade 4 of the present embodiment forms an outward convex shape where the radial position becomes large from the upstream side of the flow of the gas in the vicinity of the negative pressure surface 12d of the end wall section outer surface 10 which is the end wall on a side opposing the turbine casing 7 and in the vicinity of the front edge 12a, and forms an outward convex shape where the radial position becomes large from the upstream side of the flow of the gas in the vicinity of the pressure surface 12c and in the vicinity of the middle. By making the rotor blade 4 into such a shape, sharp speed reduction and speed increase of the flow is suppressed in the mainstream direction shown by the arrow 13, smooth transition of the speed change is allowed, and an appropriate rotor blade 4 can be provided. Also, each convex shape only has to be on the end wall, and similar effect can be obtained regardless of contact with or departing from the wing shape section 12.

In the gas turbine configured thus, the mainstream fluid having flowed in toward the turbine rotor blade 4 flows in from the blade front edge 12*a*, flows along the wing shape section 12, and flows out from the blade rear edge 12*b*. By employing the present end wall shape, the secondary flow is suppressed, the slowdown of the flow in the vicinity of the end wall of the mainstream fluid flowing along the wing shape section negative pressure surface 12*d* is suppressed, and reduction of the Mach number in the wing shape section negative pressure surface 12*d* of the rotor blade 4 also becomes small. As a result, the total pressure loss in the blade cross section of the wing shape section negative pressure surface 12*d* of the rotor blade 4 can be reduced. Also, because the mechanism of generation of the secondary flow is same between a case the load applied to the blade is high and a case the cooling flow rate mixed in changes, the increase of the total pressure loss in the blade cross section of the hub can be suppressed.

Further, the outer peripheral surface 10*a* of the end wall section is a surface forming the gas flow passage surface. On the inner periphery side of the end wall section 10, there is an inner peripheral surface 10*b* of the end wall section which forms a pair with the outer peripheral surface 10*a* of the end wall section. The end wall thickness which is the distance between this end wall section outer peripheral surface 10*a* and the inner peripheral surface 10*b* of the end wall section may be constant, and is also acceptable to be not constant.

Embodiment 2

Figure 9:
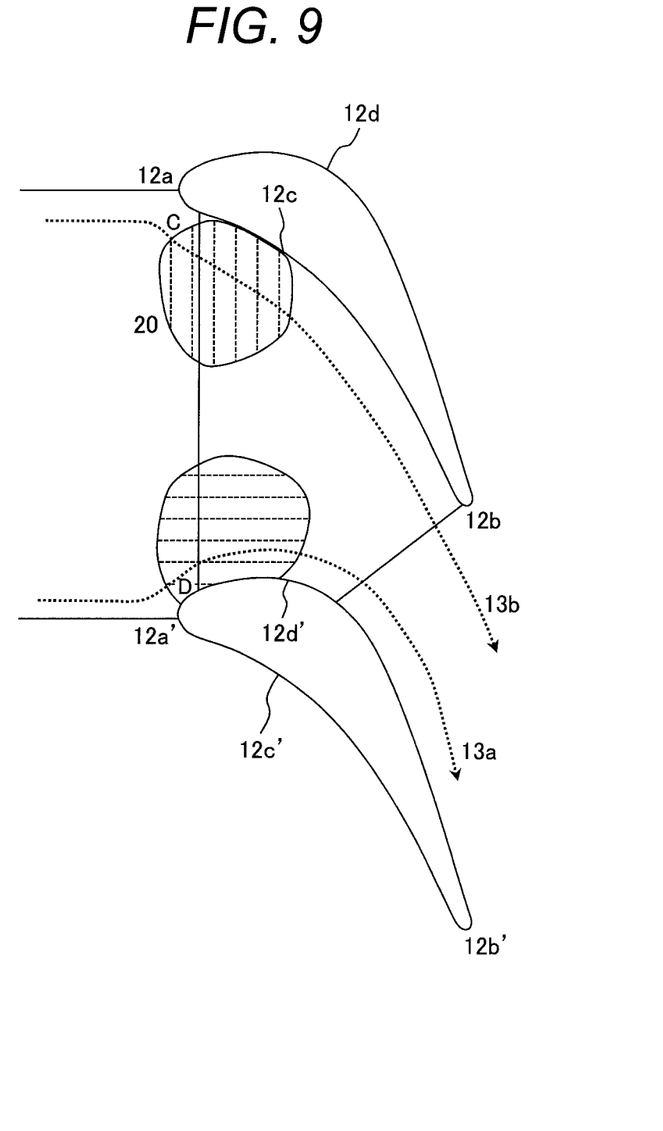
FIG. 9 is a drawing of an inner periphery side end wall section 10 of the rotor blade 4 of Embodiment 2 as viewed from the outer periphery side.

Next, Embodiment 2 will be explained using a drawing as viewed from an angle different from that in Embodiment 1. Explanation on a portion similar to that of Embodiment 1 will be omitted. FIG. 9 shows a drawing of the end wall section 10 of the rotor blade 4 of Embodiment 2 as viewed from the outer periphery side. FIG. 9 shows front edges 12*a*, 12*a*', rear edges 12*b*, 12*b*', pressure surfaces 12*c*, 12*c*', and negative pressure surfaces 12*d*, 12*d*'. A lateral dotted line section arranged in the vicinity of the front edge 12*a* on the negative pressure surface 12*d* side is formed so that the radial position becomes high: i.e. so as to become a convex shape toward the outer periphery side. Also, a vertical dotted line section arranged in the vicinity of the front edge 12*a* on the pressure surface 12*c* side is shown to be low in the radial position: i.e. to be of a shape concave toward the outer periphery side (a shape convex toward the inner periphery side). The mainstream gas flows along the profile of the wing shape section 12 as shown in FIG. 9 as a flow 13*a* in the vicinity of the end wall section 10 on the negative pressure surface 12*d* side and as a flow 13*b* in the vicinity of the end wall section 10 on the pressure surface 12*c* side.

On the negative pressure surface 12*d* side of the outer peripheral surface 10*a* of the end wall section, a region of a convex shape in the direction the radial position of the rotor 1 becomes large in the vicinity of the front edge on the flow 13*a* exists. Also, on the flow 13*b* on the pressure surface 12*c* side, a region of a concave shape where the radial position becomes small in the vicinity of the front edge exists.

The mainstream gas deflects the direction of the flow of air mixed in from the side of the end wall of the upstream of the rotor blade by the convex shape in the vicinity of the front edge 12*a* on the negative pressure surface 12*d* side, thereby collision of the cooling air mixed in and the rotor blade negative pressure surface is relaxed, and the secondary flow generated can be suppressed. Also, a convex surface and a concave surface form a pair on the negative pressure surface 12*d* side and the pressure surface 12*c* side of the end wall section 10. With such a structure, the flow passage cross-sectional area can be increased on the pressure surface 12*c* side by the portion the flow passage cross-sectional area is reduced on the negative pressure surface 12*d* side, and a similar effect can be obtained without largely changing the flow passage cross-sectional area.

Thus, the gas turbine rotor blade of the present embodiment has a convex shape in a position constituting the negative pressure surface 12*d* side and the front edge 12*a* side of the end wall section 10 and has a concave shape in a position constituting the pressure surface 12*c* side and the front edge 12*a* side of the end wall section 10, and thereby development of the secondary flow whirl 30 in the vicinity of the front edge 12*a* of the gas turbine rotor blade 4 can be suppressed even in such a case that the cooling refrigerant is mixed in from the front edge 12*a* of the end wall section 10 of the rotor blade 4. When the rotor blades 4 are assembled into a segment shape, the convex shape and the concave shape described above just should be positioned in the end wall section 10 between the plurality of rotor blades 4. Here, the front edge side means a position where the front edge 12*a* is closer compared to the rear end 12*b*.

Also, the end wall shape of a position other than the position of the convex shape and the concave shape mentioned above may be a flat face, recessed shape, and any shape as far as the effect of the convex shape and the concave shape described above is not largely inhibited.

Embodiment 3

Figure 10:
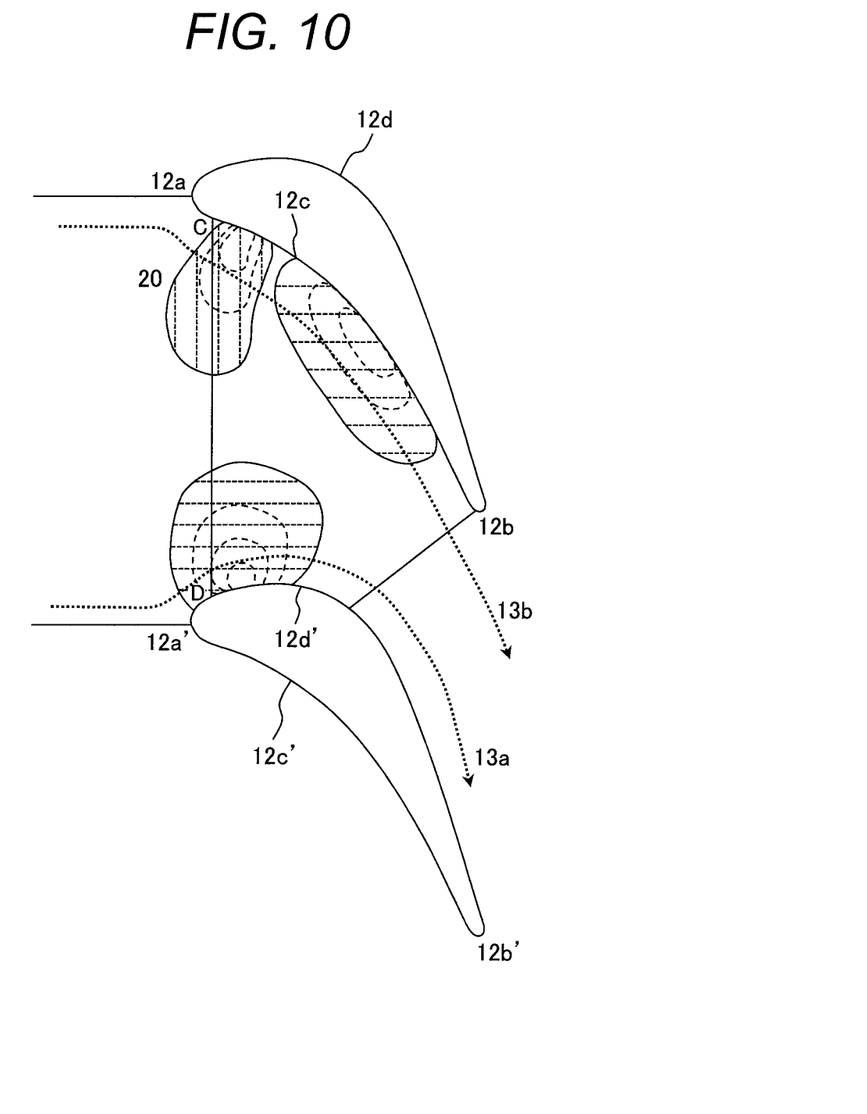
FIG. 10 is a drawing of an inner periphery side end wall section 10 of the rotor blade 4 of Embodiment 3 as viewed from the outer periphery side.

Embodiment 3 will be explained using FIG. 10. Explanation on a portion similar to that of other embodiments will be omitted. FIG. 10 shows a drawing of the end wall section 10 of the rotor blade 4 of Embodiment 3 as viewed from the outer periphery side. FIG. 10 shows front edges 12*a*, 12*a*', rear edges 12*b*, 12*b*', pressure surfaces 12*c*, 12*c*', and negative pressure surfaces 12*d*, 12*d*'. Explanation on a portion similar to that of FIG. 9 will be omitted. Curves shown by dotted lines are contours, in a shape convex toward the outer periphery side, going toward the center means being positioned toward the outer periphery side, whereas in a shape concave toward the outer periphery side, going toward the center means being positioned toward the inner periphery side.

The present embodiment has a shape convex toward the outer periphery side in the vicinity of the middle on the pressure surface 12*c* side in addition to the example shown in FIG. 9. According to the present embodiment, by the convex shape in the vicinity of the middle, in addition to the effect similar to that of Embodiment 1, with respect to a region where the pressure gradient is largest and the whirl is liable to be generated, the flow velocity is increased, sharp reduction of the flow velocity can be suppressed, and the total pressure loss can be reduced. Thus, by provision of the convex shape at a position constituting the rear edge 12*b* side of the concave shape on the pressure surface 12*c* side of the end wall section 10 in addition to Embodiment 2, the total pressure loss can be further reduced. When the rotor blades 4 are assembled into a segment shape, the convex shape and the concave shape described above just should be positioned in the end wall section 10 between the plurality of rotor blades 4. Here, when the concave shape on the pressure surface 12*c* side is positioned in the vicinity of the middle of the front edge 12*a* and the rear edge 12*b*, this effect can be enjoyed more securely.

Embodiment 4

Figure 11:
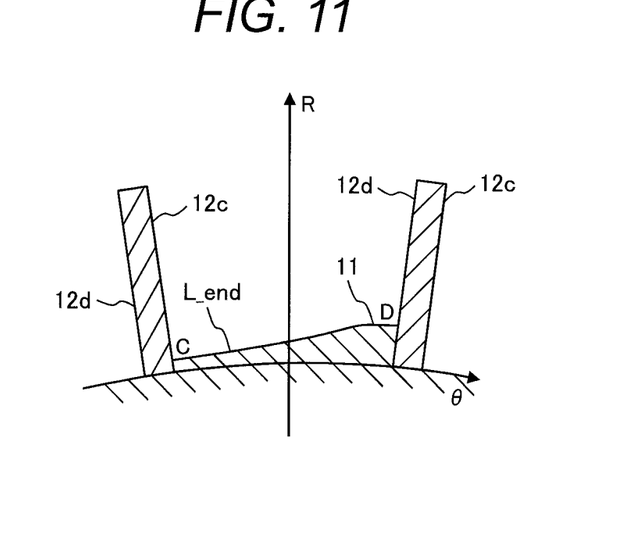
FIG. 11 is a cross-sectional view of a curved surface forming the outer periphery side end wall section inner surface 10 in the vicinity of the front edge 12a as cut by a plane perpendicular to the turbine rotation axis (CD shown in FIG. 9).

In FIG. 11, as Embodiment 4, a cross-sectional view of a curved surface forming the outer periphery side end wall section inner surface 10 in the vicinity of the front edge 12*a* as cut by a plane perpendicular to the turbine rotation axis (CD shown in FIG. 9) is shown. Explanation on a portion similar to that of other embodiments will be omitted. The cross section of such a curved surface is made a curved line L_end, the intersection point with the negative pressure surface of the wing shape section 12 is made a point C, and the intersection point with the pressure surface is made a point D. The curved line L_end extends smoothly from the intersection point C to the intersection point D. With respect to the radial position of the curved line L_end, D is higher and C is lower. The radial position of the intersection point C and the intersection point D and the shape of the curved surface L_end are selected so as to become optimum based on an aerodynamic design condition of the turbine to be designed.

Further, in Embodiment 4 shown in FIG. 11, although the curved surface L_end has a shape convex toward the outer periphery side on the negative pressure surface 12*d* side, a top part 11 of the convex shape is not a point but a flat plane section where the distance from the outer periphery side surface 10*a* of the end wall is equal distance. Thus, the top part 11 is not required to be a point, and Embodiment 4 shown in FIG. 11 also can obtain an effect similar to that of Embodiment 1. Also, the concept of the top part is to include the vertex.

Although the curved line L_end has also a region where the radial position is of same height in a same coordinate in the axial direction in the vicinity of the end wall section in the vicinity of the front edge 12*a* of FIG. 10, this condition of the same radial position is not set over the entire region of the end wall surface. When the condition of the same radial position is set over the entire region for the time being, because variation of the flow passage cross-sectional area in the rotation axis direction becomes large, the shock wave that largely affects the increase of the total pressure loss of the turbine blade is generated. Then, the condition of the pressure ratio of the inlet and outlet of the blade becomes small, and deterioration of the performance of the turbine blade is caused.

Figure 12:
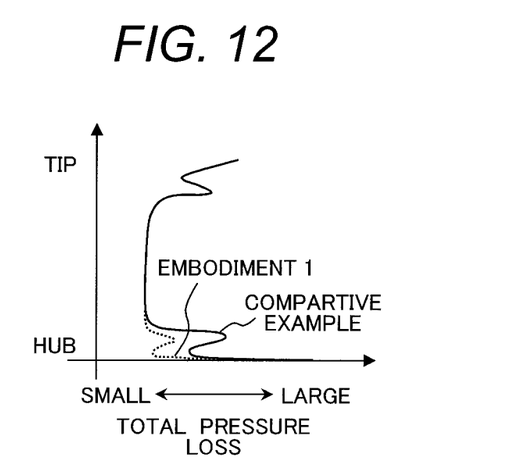
FIG. 12 is a drawing showing the total pressure loss of the blade cross section over the radial direction of the wing shape section 12.

FIG. 12 is a drawing showing the total pressure loss of the blade cross section over the radial direction of the wing shape section 12. The horizontal axis represents the total pressure loss, and the vertical axis represents the position in the radial direction of the wing shape section 12. As the comparative example, one in which the end wall section 10 is of a flat plane shape is assumed. One using the rotor blade 4 of Embodiment 1 is shown by a broken line, and the comparative example is shown by a solid line.

In Embodiment 1, as shown by the broken line, in the vicinity of the end wall section 10: i.e. on the hub side, particularly significant total pressure loss reducing effect is obtained. As Embodiment 1, by using a rotor blade of a shape leading the combustion gas that flows in the vicinity of the end wall section of the rotor blade 4 to the average diameter direction of the rotor blade 4, the gas turbine can be operated so as to rectify the flow of the combustion gas utilizing the flow of the mainstream of the combustion gas. As a result, the total pressure loss more uniform over the vertical direction of the wing shape section can be achieved. This means that more uniform expansion work is achieved over the vertical direction of the wing shape section. Thus, the turbine efficiency can be thereby improved, and the fuel consumption of the gas turbine can be reduced.

REFERENCE SIGNS LIST

1 . . . rotor,
2 . . . stator,
3 . . . rotation axis,
4 . . . rotor blade,
5 . . . compressor,
6 . . . combustor,
7 . . . casing,
8 . . . stationary blade,
9 . . . inlet,
9*a* . . . hollow section,
9*b* . . . hollow section,
10 . . . end wall section,
10*a* . . . outer peripheral surface of end wall section,
10*b* . . . inner peripheral surface of end wall section,
11 . . . top part,
12 . . . wing shape section,
12*a* . . . front edge,
12*b* . . . rear edge,
12*c* . . . pressure surface,
12*d* . . . negative pressure surface,
13 . . . tip surface,
15 . . . discharge hole,
16 . . . end wall section of stationary blade,
17 . . . gap,
18 . . . mixing in from upstream side,
19 . . . mixing in from downstream side,
20 . . . seal mechanism,
30 . . . whirl,
31 . . . "R",

The invention claimed is:

1. A gas turbine rotor blade, comprising:
a wing shape section formed of a negative pressure surface that extends from a front edge to a rear edge, a pressure surface that opposes the negative pressure surface and extends from the front edge to the rear edge, and a tip surface surrounded by a top end of the negative pressure surface and a top end of the pressure surface; and
an end wall section that is connected to a bottom end of the negative pressure surface and a bottom end of the pressure surface, wherein
the gas turbine rotor blade has a convex shape at a joint between the negative pressure surface of the wing shape section and a front edge side of the end wall section, and the gas turbine rotor blade has a concave shape at a joint between the pressure surface of the wing shape section and the front edge side of the end wall section.

2. The gas turbine rotor blade according to claim 1, wherein
the gas turbine rotor blade has a convex shape at a position constituting a rear edge side of the concave shape.

3. A gas turbine of an open cooling system, comprising:
a compressor that compresses air;
a combustor that combusts air compressed by the compressor and fuel and forms a combustion gas; and
a turbine driven by the combustion gas formed by the combustor, with the turbine including a plurality of rotor blades that receive the combustion gas and rotate and a plurality of stationary blades that restore static pressure of the combustion gas that has rotated the rotor blades, and emitting air after cooling having cooled a high temperature portion to a mainstream, wherein at least one of the rotor blades includes a wing shape section formed of a negative pressure surface extending from a front edge to a rear edge, a pressure surface opposing the negative pressure surface and extending from the front edge to the rear edge, a tip surface surrounded by both a top end of the negative pressure surface and a top end of the pressure surface opposing the negative pressure surface, and an end wall section connected to a bottom end of the negative pressure surface;

the at least one of the rotor blades has a convex shape at a joint between the negative pressure surface of the wing shape section and a front edge side of the end wall section between the plurality of rotor blades; and the at least one of the rotor blades has a concave shape at a joint between the pressure surface of the wing shape section and the front edge side of the end wall section between the plurality of rotor blades.

4. The gas turbine according to claim 3, wherein
the at least one of the rotor blades has a convex shape on a rear edge side of the concave shape.

5. The gas turbine rotor blade according to claim 1, wherein
when a position of an intersection point of the front edge and the end wall section is made 0% and a position of an intersection point of the rear edge and the end wall section is made 100%, a vertex of the convex shape is positioned within a range of 40% or less on the negative pressure surface.

6. The gas turbine rotor blade according to claim 1, wherein
when a position of an intersection point of the front edge and the end wall section is made 0% and a position of an intersection point of the rear edge and the end wall section is made 100%, a vertex of the concave shape is positioned within a range of 40% or less on the pressure surface.

7. The gas turbine rotor blade according to claim 2, wherein
when a position of a contact point of the front edge and the end wall section is made 0% and a position of a contact point of the rear edge and the end wall section is made 100%, a vertex of the convex shape is positioned within a range of 30% or more and 80% or less on the pressure surface.

8. The gas turbine according to claim 3, further comprising a seal mechanism that restricts a flow rate of a cooling refrigerant passing through a gap between a rotating body and a stationary body.

9. A method for operating a gas turbine of an open cooling system according to claim 3, comprising:
producing a flow of the combustion gas formed by the combustor; and
rectifying the flow of the combustion gas utilizing a flow of a mainstream of the combustion gas by using rotor blades of shapes leading the combustion gas flowing in a vicinity of the end wall section.

10. The gas turbine according to claim 3, wherein
when a position of an intersection point of the front edge and the end wall section is made 0% and a position of an intersection point of the rear edge and the end wall section is made 100%, a vertex of the convex shape is positioned within a range of 40% or less on the negative pressure surface and front edge side of the end wall section.

11. The gas turbine according to claim 3, wherein
when a position of an intersection point of the front edge and the end wall section is made 0% and a position of an intersection point of the rear edge and the end wall section is made 100%, a vertex of the concave shape is positioned within a range of 40% or less on the pressure surface and front edge side of the end wall section.

12. The gas turbine according to claim 4, wherein
when a position of a contact point of the front edge and the end wall section is made 0% and a position of a contact point of the rear edge and the end wall section is made 100%, a vertex of the convex shape is positioned within a range of 30% or more and 80% or less on the pressure surface and front edge side of the end wall section.

* * * * *